(12) United States Patent
Dawson et al.

(10) Patent No.: US 7,817,623 B2
(45) Date of Patent: Oct. 19, 2010

(54) OPTIMIZATION PROCESS AND SYSTEM FOR NON-MULTIPLEXED PEER-TO-PEER ARCHITECTURE

(75) Inventors: Christopher J. Dawson, Arlingrton, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 11/755,802

(22) Filed: May 31, 2007

(65) Prior Publication Data

US 2008/0300932 A1    Dec. 4, 2008

(51) Int. Cl.
*H04L 12/26* (2006.01)

(52) U.S. Cl. .................. 370/352; 370/465; 370/469; 370/389

(58) Field of Classification Search .................. 370/229, 370/230, 230.1, 233, 234, 238, 254, 255, 370/310, 310.1–310.2, 328, 329, 331, 332, 370/351, 352, 355–358, 389, 391, 396, 398, 370/395.21, 395.4–395.43, 395.5, 400, 401, 370/433, 437, 464–469, 477, 435.1–435.3, 370/436, 450, 454, 452.1–452.2

See application file for complete search history.

(56) References Cited

U.S. PATENT DOCUMENTS

| | | | |
|---|---|---|---|
| 5,490,201 A | 2/1996 | Moberg et al. | |
| 6,006,084 A | 12/1999 | Miller et al. | |
| 6,035,281 A | 3/2000 | Crosskey et al. | |
| 6,047,268 A | 4/2000 | Bartoli et al. | |
| 6,366,907 B1 * | 4/2002 | Fanning et al. | 707/3 |
| 6,396,805 B2 | 5/2002 | Romrell | |
| 6,397,061 B1 | 5/2002 | Jordan et al. | |
| 6,522,735 B1 | 2/2003 | Fortman et al. | |
| 6,653,933 B2 * | 11/2003 | Raschke et al. | 370/203 |
| 6,751,196 B1 * | 6/2004 | Hulyalkar et al. | 370/252 |

(Continued)

FOREIGN PATENT DOCUMENTS

EP    0999662    5/2005

(Continued)

OTHER PUBLICATIONS

Non-final Office Action dated Dec. 23, 2008 in U.S. Appl. No. 11/755,806.

(Continued)

*Primary Examiner*—Pankaj Kumar
*Assistant Examiner*—Mark A Mais
(74) *Attorney, Agent, or Firm*—William Schiesser; Roberts Mlotkowski Safran & Cole (57) ABSTRACT

Process and system for optimizing one of uploading and downloading of at least one file through at least one lender in a peer-to-peer architecture. The process includes identifying available lenders within a vicinity of a borrower, selecting a number of lenders based upon at least one requester optimization criterion, dividing the at least one file to be one of uploaded or downloaded into parts corresponding to the number of selected lenders, assigning a part of the at least one file to each selected lender, and performing one of an upload or a download of the parts through the selected lenders.

44 Claims, 7 Drawing Sheets

U.S. PATENT DOCUMENTS

| | | | |
|---|---|---|---|
| 6,763,248 B1 | 7/2004 | Odamura et al. | |
| 6,810,428 B1 | 10/2004 | Larsen et al. | |
| 6,850,764 B1 * | 2/2005 | Patel | 455/450 |
| 6,941,378 B2 | 9/2005 | Apostolopoulos et al. | |
| 6,954,616 B2 * | 10/2005 | Liang et al. | 455/63.1 |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 6,990,113 B1 * | 1/2006 | Wang et al. | 370/412 |
| 7,016,375 B1 | 3/2006 | Rosenberg et al. | |
| 7,028,096 B1 | 4/2006 | Lee | |
| 7,043,225 B1 * | 5/2006 | Patel et al. | 455/405 |
| 7,058,014 B2 * | 6/2006 | Sim | 370/230 |
| 7,058,387 B2 * | 6/2006 | Kumar et al. | 455/406 |
| 7,065,367 B2 * | 6/2006 | Michaelis et al. | 455/452.2 |
| 7,075,890 B2 | 7/2006 | Ozer et al. | |
| 7,089,301 B1 * | 8/2006 | Labio et al. | 709/224 |
| 7,130,283 B2 | 10/2006 | Vogel et al. | |
| 7,174,385 B2 * | 2/2007 | Li | 709/231 |
| 7,224,964 B2 * | 5/2007 | Souissi et al. | 455/414.4 |
| 7,257,632 B2 * | 8/2007 | Zhang et al. | 709/226 |
| 7,274,658 B2 * | 9/2007 | Bornstein et al. | 370/227 |
| 7,310,641 B2 * | 12/2007 | Moore et al. | 707/6 |
| 7,340,759 B1 | 3/2008 | Rodriguez | |
| 7,376,747 B2 * | 5/2008 | Hartop | 709/233 |
| 7,401,153 B2 * | 7/2008 | Traversat et al. | 709/230 |
| 7,440,573 B2 * | 10/2008 | Lor et al. | 380/270 |
| 7,447,656 B2 | 11/2008 | Parthasarathy | |
| 7,450,517 B2 | 11/2008 | Cho | |
| 7,450,949 B2 * | 11/2008 | Choksi | 455/452.2 |
| 7,460,549 B1 * | 12/2008 | Cardei et al. | 370/408 |
| 7,463,890 B2 * | 12/2008 | Herz et al. | 455/445 |
| 7,489,656 B2 * | 2/2009 | Guo et al. | 370/329 |
| 7,546,342 B2 * | 6/2009 | Li et al. | 709/203 |
| 7,593,333 B2 * | 9/2009 | Li et al. | 370/232 |
| 2001/0029182 A1 | 10/2001 | McCann et al. | |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0069278 A1 | 6/2002 | Forslöw | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1 | 9/2002 | Kulikov et al. | |
| 2002/0141358 A1 | 10/2002 | Requena | |
| 2002/0145978 A1 | 10/2002 | Batsell et al. | |
| 2003/0068975 A1 | 4/2003 | Qiao et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0153338 A1 | 8/2003 | Herz et al. | |
| 2003/0235174 A1 | 12/2003 | Pichna et al. | |
| 2004/0006621 A1 | 1/2004 | Bellinson et al. | |
| 2004/0029553 A1 | 2/2004 | Cain | |
| 2004/0064351 A1 | 4/2004 | Mikurak | |
| 2004/0128231 A1 | 7/2004 | Morita | |
| 2004/0156312 A1 | 8/2004 | Salonidis et al. | |
| 2004/0162871 A1 * | 8/2004 | Pabla et al. | 709/201 |
| 2004/0165548 A1 | 8/2004 | Backes | |
| 2004/0185777 A1 | 9/2004 | Bryson | |
| 2004/0260808 A1 | 12/2004 | Strutt | |
| 2004/0264466 A1 | 12/2004 | Huang | |
| 2005/0080872 A1 | 4/2005 | Davis et al. | |
| 2005/0153725 A1 | 7/2005 | Naghian et al. | |
| 2005/0157661 A1 | 7/2005 | Cho | |
| 2005/0169209 A1 | 8/2005 | Miu et al. | |
| 2005/0169257 A1 | 8/2005 | Lahetkangas et al. | |
| 2005/0193221 A1 | 9/2005 | Yoneyama | |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0085543 A1 | 4/2006 | Hrastar et al. | |
| 2006/0095582 A1 | 5/2006 | Nitya et al. | |
| 2006/0114853 A1 | 6/2006 | Hasty et al. | |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0224502 A1 | 10/2006 | McGowan | |
| 2007/0005797 A1 | 1/2007 | Fontijn et al. | |
| 2008/0040481 A1 | 2/2008 | Joshi et al. | |
| 2008/0167982 A1 | 7/2008 | Leo et al. | |

FOREIGN PATENT DOCUMENTS

| | | |
|---|---|---|
| WO | 9915960 | 4/1999 |
| WO | 03 037009 | 5/2003 |
| WO | 2004 001585 | 12/2003 |
| WO | 2006 004628 | 1/2006 |

OTHER PUBLICATIONS

Final Office Action dated Jun. 3, 2009 in U.S. Appl. No. 11/755,806.
Final Office Action dated Jun. 9, 2009 in U.S. Appl. No. 11/755,806.
D. Zhu et al., "QoS Aware Wireless Bandwidth Aggregation (QAWBA) by Integrating Cellular and Ad-hoc Networks."
D. Zhu et al., "Using Cooperative Multiple Paths to Reduce File Download Latency in Cellular Data Networks."
Non-final Office Action dated Nov. 25, 2009 in U.S. Appl. No. 11/755,780.
Non-final Office Action dated Oct. 19, 2009 in U.S. Appl. No. 11/755,788.
Qui et al.. "Bandwidth in Ad Hoc Networks: A Price-Based Approach," 2003, IEEE, pp. 1-10.
Non-final Office Action dated Dec. 24, 2009 in U.S. Appl. No. 11/755,776.
Non-final Office Action dated Jan. 22, 2010 in U.S. Appl. No. 11/755,778.
Non-final Office Action dated Jan. 21, 2010 in U.S. Appl. No. 11/755,808.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Non-Final Office Action dated Mar. 4, 2010 in U.S. Appl. No. 11/755,775.
Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jul. 13, 2010 in U.S. Appl. No. 11/755,778.
Notice of Allowance dated Jun. 28, 2010 in U.S. Appl. No. 11/755,771.
Notice of Allowance dated Aug. 16, 2010 in U.S. Appl. No. 11/755,763.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

OPTIMIZATION PROCESS AND SYSTEM FOR NON-MULTIPLEXED PEER-TO-PEER ARCHITECTURE

CROSS-REFERENCE TO RELATED APPLICATIONS

This application is related to the following copending applications, all of which are incorporated herein by reference in their entireties: Copending application Ser. No. 11/755 808; copending application Ser. No. 11/755,780; and copending application Ser. No. 11/755,775.

FIELD OF THE INVENTION

The invention generally relates to systems and processes for optimizing a borrower's selection of lender bandwidth in an ad hoc network and, more particularly, to systems and processes for optimizing a borrower's selection of lender bandwidth in a non-multiplexed peer-to-peer architecture for mobile ad hoc networks according to various optimization objectives.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method includes identifying available lenders within a vicinity of a borrower, selecting a number of lenders based upon at least one requester optimization criterion, dividing at least one file to be one of uploaded and downloaded into parts corresponding to the number of selected lenders, assigning a part of the at least one file to each selected lender, and performing one of an upload and a download of the parts through the selected lenders.

In another aspect of the invention, a system is provided for optimizing selection of bandwidth in a peer-to-peer architecture. The system includes a device for identifying available bandwidth lenders within a vicinity of a requester, a selector unit to select a number of lenders based upon at least one requester optimization criterion, a divider structured and arranged to divide a task into a number of discrete pieces that correspond to the number of selected lenders, and an assignor unit to assign each discrete piece of the task to different selected lender.

In another aspect of the invention, a system includes a server having a database containing data associated with one or more instructions for implementing a peer-to-peer ad-hoc network, and at least one of a hardware and software component for optimizing selection of lenders of bandwidth and allocation of one of files and pieces of files to the selected lenders of bandwidth and for establishing the peer-to-peer ad-hoc network between a borrower and the selected lenders of bandwidth.

In another aspect of the invention, a method is provided for optimizing selection of bandwidth in a peer-to-peer architecture. The method includes a computer infrastructure operable to select a number that corresponds to a number of lenders of bandwidth from which to borrow bandwidth and to a number of discrete pieces to divide a task, select a number of lenders of bandwidth from a listing of available lenders, and assign each piece of the divided task to a different selected lender of bandwidth.

In another aspect of the invention, a computer program product comprises a computer usable medium having readable program code embodied in the medium and includes at least one component to identify available bandwidth lenders within a vicinity of a requester, select a number of lenders based upon at least one requester optimization criterion, divide a task into discrete pieces that correspond in number to the selected lenders, and assign each discrete piece to a different selected lender.

DETAILED DESCRIPTION OF EMBODIMENTS OF THE INVENTION

The present invention is directed to a process and system for optimizing a borrower's lender selection in a non-multiplexed peer-to-peer architecture for mobile ad hoc networks according to various optimization objectives of the borrower. The optimization can be based on time, cost, bandwidth or other optimization considerations. In general, the borrower decides the number of lenders to select, which lenders to select, and how to divide large files and assign portions to selected lenders.

As the above-noted decisions are not easily made within a short period of time, the borrower can predefine preferences in order to automatically divide and assign files and automatically select a certain number of lenders. These predefined preferences can be stored in user's device, e.g., notebook, PDA, smart phone, etc., or can be stored in a remote location maintained by a service provider, e.g., a centralized database for storing information regarding borrowers and lenders.

In a peer-to-peer architecture for ad hoc networks, a borrower can be connected directly to multiple lenders. According to the invention, depending on the demand and supply situation for lenders, a borrower can optimize the situation to his/her advantage. By using a scheme for borrowing bandwidth within an ad hoc network, multiple disparate wireless connections in conjunction with multiple devices using a variety of service providers, for examples can be used to create a single virtual fat pipe for transmission of data over a network. The individuals who share their current connections, e.g., bandwidth, acting as gateway devices, are lenders of bandwidth; whereas, the individuals who require additional bandwidth are borrowers. In this way, a borrower in need of bandwidth may borrow bandwidth from lenders in an ad hoc network, utilizing the lenders' bandwidth (e.g., cellular connection to the Internet, hotspot connection, etc.) in the manner best suited to the borrower's task.

System Environment

Figure 1:
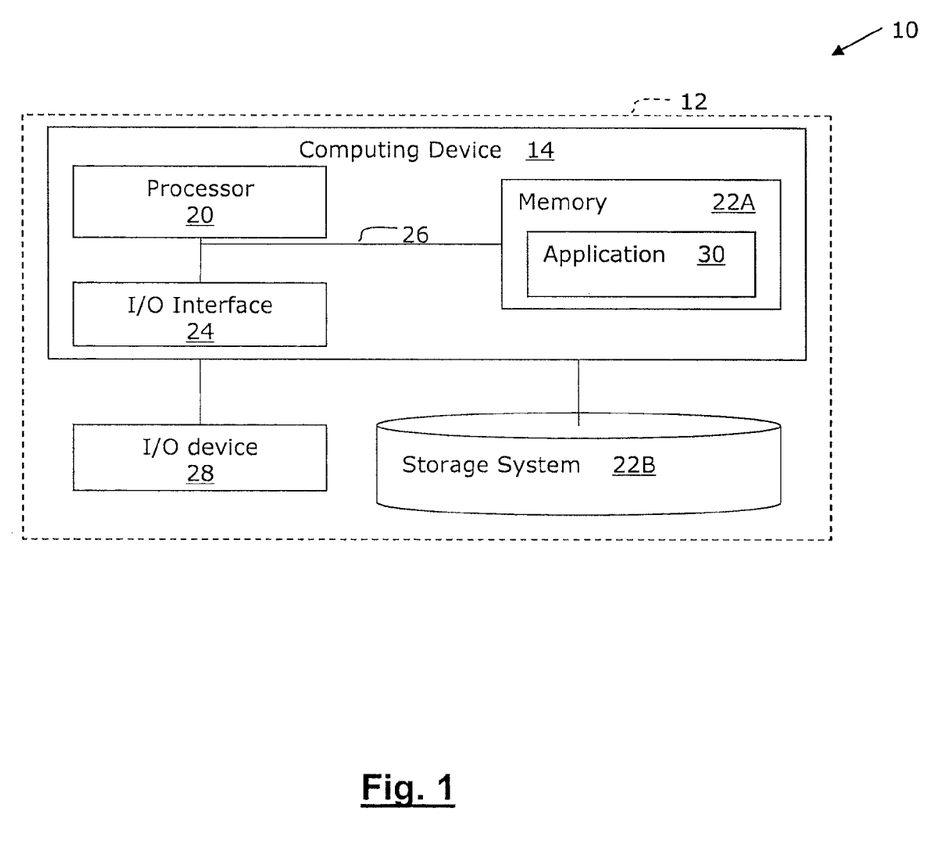
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to permit compensation schemes between borrowers, or their service providers, and lenders, or their service providers, for borrowed bandwidth within an ad hoc network, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is a 802.11g local area connection that creates a high-speed wireless connection between two cellular phone devices within close range (high bandwidth), and wherein the cellular phones' cellular connection may provide bandwidth at less than $\frac{1}{100}^{th}$ of the 802.11 connection.

The present invention is directed to systems and methods by which a borrower of bandwidth in an ad hoc network selects lenders of bandwidth in an effort to optimize the cost of services, time of upload/download, etc. The specific pricing mechanisms which can be implemented with the invention are disclosed in the following applications, all which are hereby incorporated by reference in their entirety. For example, the negotiation and acceptance of agreed pricing, and the formation and rearrangement of the bandwidth sharing ad hoc networks is set forth in co-pending application Ser. No. No. 11/755,775. The negotiation and acceptance of agreed pricing, and the formation and rearrangement of lending devices that perform multiplexing functions is set forth in co-pending application Ser. No. 11/755,779. Price offerings are set forth in co-pending application Ser. No. 11/755,782. Market price offerings are set forth in co-pending application Ser. No. 11/755,800.

To access a wireless network, a user needs an access point connection, e.g., a wireless router, hot spot, wireless connection port. However, when a user is not in the vicinity of such an access point connection, various devices, e.g., cell phones, can be used to provide a connection to a wireless network, but the bandwidth may be limited, i.e., not sufficient to enable fast exchanges, e.g., uploads, downloads, etc. Thus, through the ad hoc network the user or borrower can use unused bandwidth of others or lenders to partition tasks and speed up transmission, thereby reducing wait time.

In general, the invention comprises optimizing the selection of lenders based upon their different payment schemes and available bandwidth. For example, in an embodiment of the invention, a borrower of bandwidth may select lenders so as to minimize the cost of completing the task. In another embodiment, a borrower of bandwidth may select lenders so as to minimize the time for completing the task. In another embodiment, a borrower may select lenders so as to maximize the throughput of data to complete the task. In another embodiment, a borrower may select lenders in order to reduce the risk of drop-offs during the task. In another embodiment, a borrower may select lenders based upon the lenders history of reliability. In another embodiment, a borrower may select lenders in an effort to maximize lender capabilities.

General Overview of Ad Hoc Networks

In order to utilize compensation mechanisms for sharing bandwidth, an ad hoc network may be created between a borrower node and one or more lender nodes, and a compensation scheme for the shared bandwidth may be established. This process may include both an initial discovery mechanism of the proposed role each node may play, and a negotiation and acceptance of the agreed compensation scheme.

Figure 2:
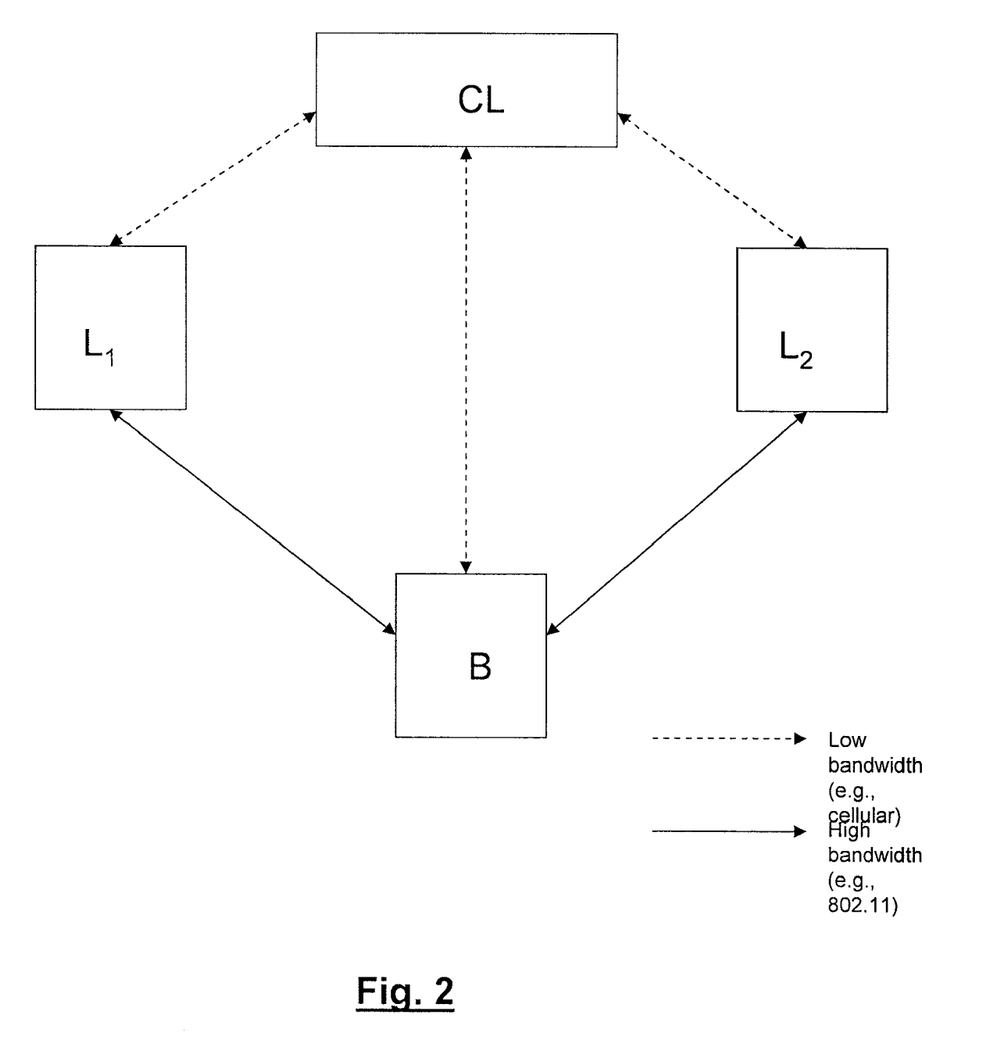
FIG. 2 is an overview of a peer-to-peer bandwidth-sharing ad hoc network.

FIG. 2 is a general overview of a non-multiplexed, peer-to-peer bandwidth sharing architecture which may be implemented with the systems and methods of the invention. An illustrative non-multiplexed, peer-to-peer bandwidth sharing architecture is set forth in co-pending application Ser. No. 11/755,808. In this implementation, a borrower B may request information, e.g., transfer of files, from a central location, CL (or distributed locations). To increase its bandwidth capacity, the borrower B may request bandwidth from any of the lenders, L1 or L2 via any known wireless protocol. By way of example, upon a broadcast request from the borrower B, any of the lenders, L1 or L2 may allow the borrower B to use their excess bandwidth for file transfers with the central location, CL (or distributed locations). Upon authorization, the lenders, via a wireless protocol, for example, will download information from the central locations, CL, and send this information to the borrower, B, thus effectively increasing the borrower's bandwidth (or distributed locations).

Initial Formation of the Ad Hoc Network

Figure 3:
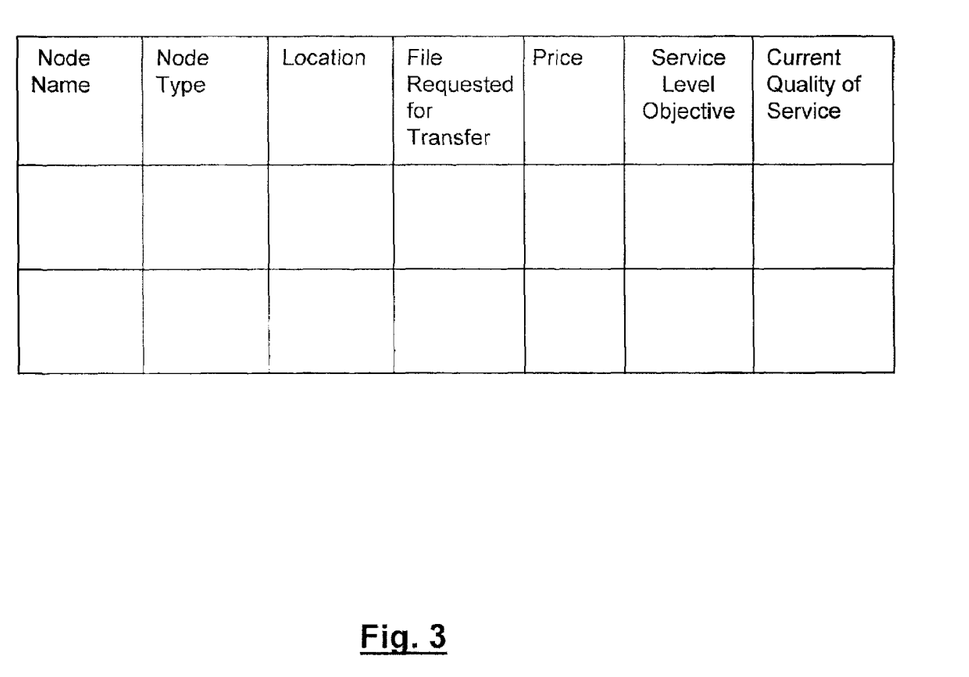
FIG. 3 is an overview for initiating an ad hoc network.

In either the peer-to-peer or gateway environments, in order to form a new ad hoc network, a borrower may scan all available potential lenders and prioritize the potential lenders for a data transfer. The formation of the ad hoc network, in embodiments, may use a 'borrower/lender' table as shown in FIG. 3. In this example, the borrower or gateway (e.g., multiplexer) will broadcast the table to potential lenders which, in turn, will return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 3, the "Node Name" column may be the unique identifier of a node such as the borrow and lenders. For example, this could be a hostname, a Bluetooth® name or any other information that can uniquely describe the node. The "Node Type" column may describe whether this node is a borrow, a lender, or a gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QOS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Flow Diagrams

The flow diagrams described herein may be implemented in environments that enable the borrower to select lender's bandwidth based upon optimization criteria. By way of example, the flow diagrams can be implemented in the environment of FIG. 1 to provide instructions for selecting one or more lenders' bandwidth in an ad hoc network and/or may be implemented in the environment of FIGS. 2 and/or 3 to provide instructions for selecting one or more lenders' bandwidth in the non-multiplexed, peer-to-peer bandwidth sharing architecture. In the various disclosed exemplary embodiments, described below, a bandwidth sharing agreement may be reached on data, quality of service (QoS) and associated costs. This agreement may include compensation instructions for compensating one or more lenders of bandwidth in the ad hoc network.

The flow diagrams may represent a high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 4:
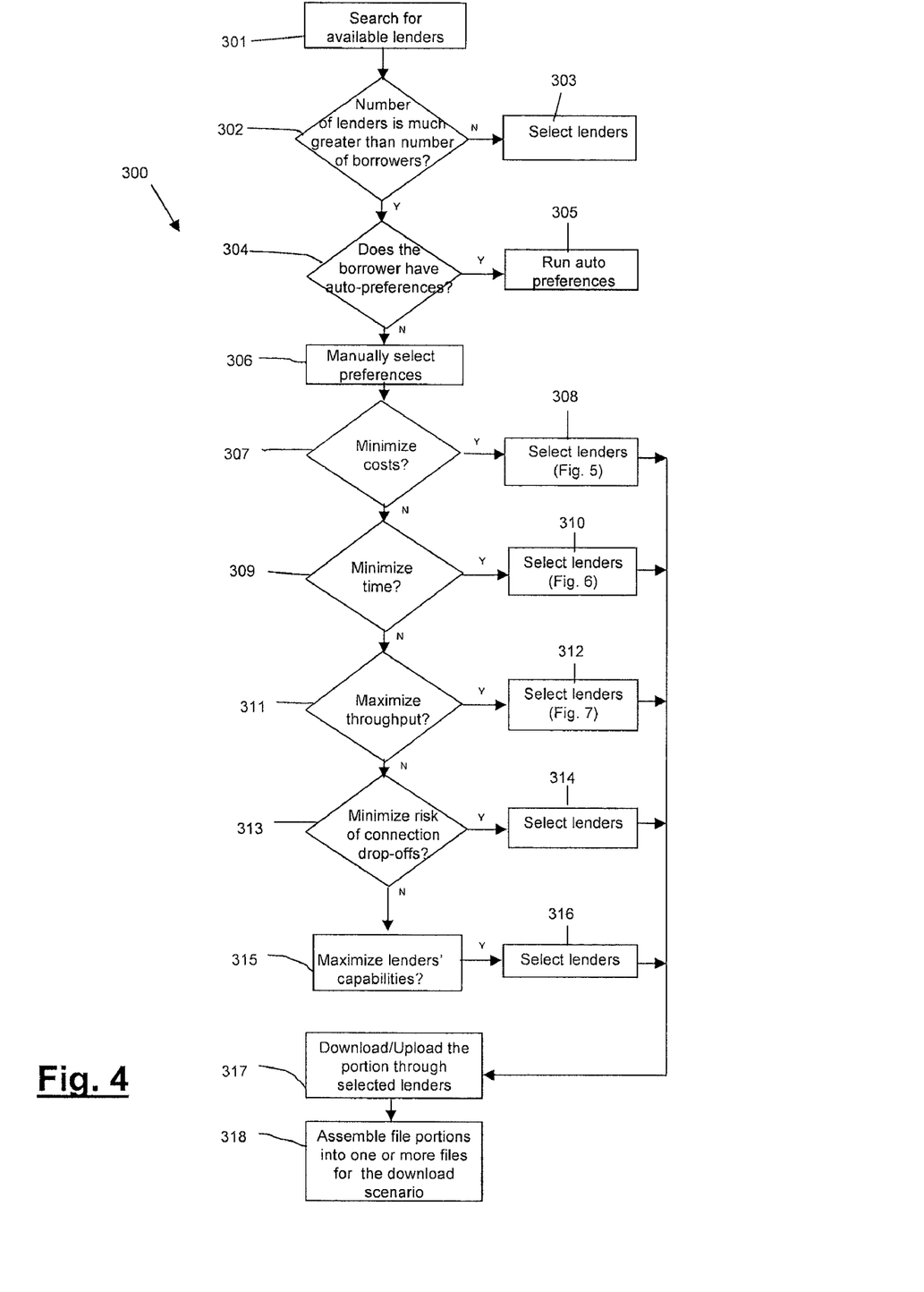
FIG. 4 is a flow diagram for generally implementing the invention.

By way of non-limiting example, FIG. 4 illustrates a flow diagram 300 of a process for optimizing a borrower's selection of lenders. It is understood that this and all other illustrated examples are provided to facilitate explanation of the invention, but are not to be construed as limiting, such that other flow diagrams and/or processes for optimizing a borrower's selection of lenders in accordance with the features of the invention are within the scope of the instant invention.

As shown, a search for available lenders willing to share bandwidth is performed at step 301 and a determination is made at step 302 whether there is a much greater number of available lenders than potential borrowers. The search or scan for available lenders can be performed by a device utilized for searching or scanning for wireless connection ports, hot spots, etc. By way of example, more than 10 available lenders for each potential borrower can be considered a much greater number to satisfy step 302. In any event, it is sufficient that plenty of lenders willing to share their bandwidth are found/available so the borrower does not need to worry about being able to find enough lenders to support its bandwidth needs.

When sufficient lenders are available, the borrower can make choices between the various available lenders according to a variety of selection criteria. Conversely, when only a limited number of lenders are available for each borrower, or even if the number of lenders is less than the number of borrowers (i.e., supply is less than demand), the borrower's ability to optimize lender selection is greatly reduced, since the lenders may take advantage of this situation and raise prices, or they may even auction their bandwidth to the potential borrowers requesting bandwidth. Thus, in a situation like this, the borrower at step 303 must select lenders without regard to optimizing the selection. For example, it may be advantageous for a borrower to approach lenders who use the "first come first serve" (i.e., "offer and wait") policy rather than getting into a bidding war with other borrowers. Further, if costs are not a concern to the borrower when few lenders are available, the optimization process discussed below can be performed, albeit within a more constrained operation, i.e., as the supply is much smaller, the borrower has a much smaller list of lenders from which to select.

When a much greater number of available lenders is found at step 302, a determination is made at step 304 whether the borrower has predefined preferences established. When such preferences are predefined and stored, e.g., in the user's device or in a remote database of a service provider, the lenders are selected according to the stored preferences, and, if desired, the file(s) are divided among the selected lenders also according to the stored preferences at step 305, and the file(s) are downloaded/uploaded through the selected lenders at step 317. The predefinable borrower's preferences correspond to the selections made by the borrower between step 306 and step 316 of the flow diagram, such that these selections can be stored for selecting lenders in a subsequent borrowing of bandwidth. When no predefined preferences are established, the borrower manually optimizes the selection of lenders at step 306. In this regard, software can be stored, e.g., on the user's device or on the service provider's remote database, to prompt the borrower to insert information in order to optimize the lender selection.

At step 307, the borrower decides whether to optimize so as to minimize cost to the borrower. If cost is the prime concern of the borrower, the lenders are selected at step 308 so as to minimize cost. The process for selecting lenders to minimize cost is detailed below in FIG. 5.

If cost is not a concern, the borrower decides at step 309 whether to optimize so as to minimize time. If the borrower indicates minimizing time is important, the lenders are selected at step 310. The process for selecting lenders to minimize time is detailed below in FIG. 6. Should time also not be a primary concern, another optimization parameter for the borrower to consider is maximum throughput at step 311. Thus, if maximum throughput is selected, the lenders are selected to maximize throughput at step 311. The process for selecting lenders in order to maximize throughput is detailed below in FIG. 7. Another alternative optimization routine is minimizing the risk of drops at step 313. If reliability of the lender to complete the task is a concern for the borrower, the lenders are selected at step 314 so minimize the risk of drops. Still another alternative optimization routine is maximizing lender capabilities at step 315. If the borrower would like to take advantage of the lender capabilities, the lenders are selected at step 316. After the lenders are selected in any of steps 308, 310, 312, 314, or 316, the file(s) are divided among the selected lenders, and the file(s) are downloaded/uploaded through the selected lenders at step 317. The borrower's device at step 318 can assemble these downloaded pieces into one or more files for the download scenario, or assigns the file portions to the selected lenders for the upload scenario.

Figure 5:
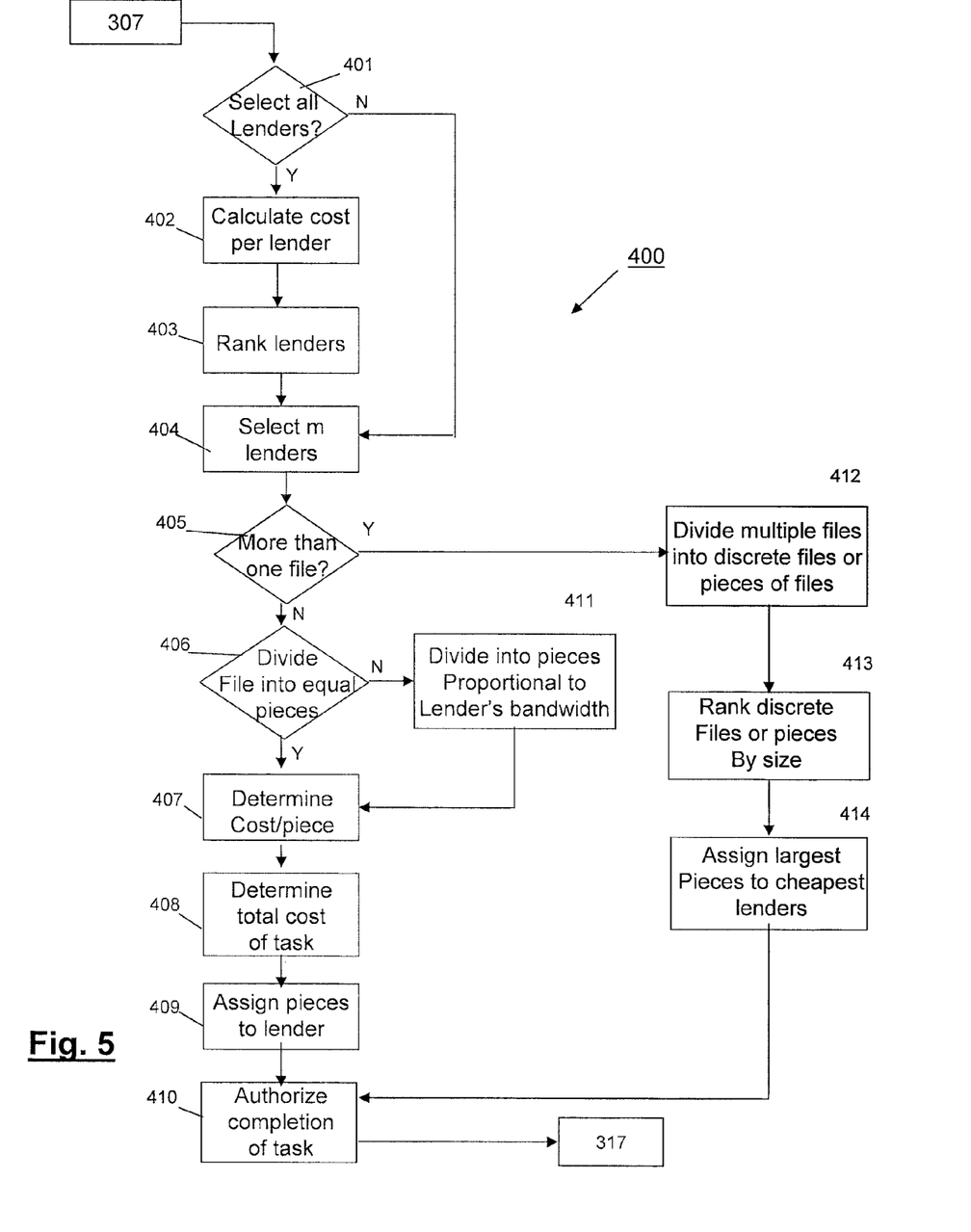
FIG. 5 is a flow diagram for generally implementing optimization for minimum cost in accordance with aspects of the invention.

An exemplary process 400 for selecting lenders in order to minimize cost is illustrated in FIG. 5. An initial decision for the borrower is how many lenders will be needed to complete the task. Therefore, at step 401, a decision is made whether to select all available lenders. If all available lenders are selected, the process proceeds to step 405. When the borrower desires more input into the selection of lenders, to ensure that cost is minimized, the cost for each available lender is calculated at step 402, and each lender is subsequently ranked according to cost, e.g., from lowest cost to highest cost, at step 403. While it is certainly possible for the borrower to use only a single lender, e.g., the lender ranked with the cheapest cost to complete the entire job, because there are multiple lenders available, it is possible to branch out beyond this single lender if time is considered a secondary or lower priority. In this manner, the borrower can speed up his task and download much faster than through a single lender.

In determining the lender cost, it should be understood that lenders can charge in different ways, e.g., price per minute, price per Mb downloaded, etc. However, because the cost the borrower pays for each lender is calculated in relation to the lender's bandwidth, size of the file to be uploaded/downloaded, and time used, lenders with the cheapest price per minute or cheapest price per Mb downloaded are not necessarily the cheapest lenders. At step 402, the cost for each lender is calculated as if each lender is the only lender used to complete the task. For lenders charging for bandwidth usage per minute, the following Equation 1a may be utilized:

$$Cost_j = Price_j * ((F/Bandwidth_j)/60), j=1 \ldots n \qquad \text{(Equation 1a)}$$

Where: F is the size of the task, i.e., large file(s);
Price j is price of Lender j's bandwidth (in Mbps) usage per minute; and
n is the number of available lenders.

For lenders charging per certain Mb of download, the following Equation 1b may be utilized:

$$Cost_j = Price_j * (F/x), j=1 \ldots n \qquad \text{(Equation 1b)}$$

Where: F is the size of the task, i.e., large file(s);
Price j is Lender j's price of bandwidth usage per x Mb of download; and
n is the number of available lenders.

Once each lender's cost is calculated, the lenders are ranked or arranged according to their calculated costs of performing the entire task alone. By way of example, the lenders can be arranged from least or lowest cost to highest cost. From this ranking or listing of the lenders according to cost, the borrower can select one or more of the lenders to complete the task at step 404.

Moreover, to leverage the peer-to-peer environment, the borrower can divide a large file into smaller pieces or divide a number of files into individual files and/or pieces, and assign a piece and/or file to each lender for uploading/download. In this regard, at step 405, the borrow indicates whether more than one file is included in the task, i.e., for uploading/downloading.

When only one file is included in the task, a determination is made whether to divide the file into equal pieces for assignment to the selected lenders at step 406. Assuming "m" lenders were selected by the borrower, where m<n, the file is divided into "m" equal pieces. The cost for each piece can be calculated at step 407, and the specific cost for each piece depends upon the manner in which the specific lender charges for available bandwidth. For lenders charging for bandwidth usage per minute, the following Equation 2a can be utilized:

$$Cost_j = Price_j * ((f/Bandwidth_j)/60), \qquad \text{(Equation 2a)}$$

Where: f is the size of the file piece (F/m) assigned to lender j for download;
Price j is price of Lender j's bandwidth (in Mbps) usage per minute;
F is the size of the task, i.e., large file; and
m is the number of selected lenders.

For lenders charging per certain Mb of download, the following Equation 1b can be utilized:

$$Cost_j = Price_j * (f/x), \qquad \text{(Equation 2b)}$$

Where: f is the size of the file piece (F/m) assigned to lender j for download;
Price j is Lender j's price of bandwidth usage per x Mb of download; and
F is the size of the task, i.e., large file; and
m is the number of selected lenders.

Once the cost for each piece is calculated, the total cost for the upload/download is calculated at step 408. The total cost can be calculated by equation 3:

$$CostTotal = \Sigma(Cost_j), j=1 \ldots m \qquad \text{(Equation step 3)}$$

Where: Costj is the cost, determined from either Equation 2a or 2b, for each of the selected lenders 1-m for a piece.

After a total cost for performing the task is calculated, the borrower can assign the pieces to the lenders at step 409, if the cost is satisfactory, and then authorize the completion of the task, e.g., the upload/download, at step 410. Thereafter, the process proceeds to step 317 of FIG. 3. However, when the file is divided into "m" equal sized pieces, an easier manner for minimizing cost for the borrower can be achieved by simply selecting the set of "m" lenders who yield the lowest costs for the borrower as calculated by Equations 1a or 1b, and assigning a piece to each selected lender. In this manner, the process can go from steps 406 to 409.

As an alternative, the file can be divided into unequal sized pieces. By way of example, the pieces can be sized in proportion to lender bandwidth at step 411. For purposes of this exemplary embodiment, it is assumed that the borrower selected the "m" cheapest lenders at step 404, however, it is understood that all lenders or any number of lenders can be selected at step 404 (and/or step 401). Accordingly, the file may be divided into "m" pieces, and each piece can be assigned to one of the selected lenders. It may be advantageous for the borrower to assign the largest piece of data to the lender with the fastest connection. Moreover, the pieces can be cut in proportion to the lender's bandwidth. The size of the piece assigned to lender j can be calculated from Equation 4:

$$f_j = [Bandwidth_j / (\Sigma_j Bandwidth_j)] * F, j=1 \ldots m \qquad \text{(Equation 4)}$$

Where: fj is a piece of large file F assigned to lender j;
lender j is one of the cheapest "m" lenders derived from step 1,
Bandwidthj is the bandwidth (in Mbps) of lender j; and
ΣjBandwidthj is the aggregated bandwidth of the top "m" cheapest lenders, j=1 ... m Thus, after dividing the large file F into pieces, large file F can be composed of:

$$F = f1 + f2 + \ldots + fm \quad \text{(Equation 5)}$$

Then the total cost to the borrower for borrowing bandwidth from the "m" selected lenders can be calculated at step 407 by the above-discussed Equation 3:

$$\text{CostTotal} = \Sigma(\text{Cost}j), j=1 \ldots m \quad \text{(Equation 3)}$$

Where Costj is the cost for charges by lender j, where j is between 1 and "m" and Costj is from either Equation 2a or Equation 2b (depending on whether the lender charges per minute or per download size). The process then continues to step 408.

When more than one file is to be downloaded at step 405, or if multiple files (or pieces of the same file) are to be downloaded from multiple sources, the borrower can simply assign the tasks to the selected lenders.

In an exemplary embodiment, the multiple files are divided at step 412 into a number of individual files or pieces of files that corresponds to the number of selected lenders. In this manner, the files and/or pieces of files to be assigned are known ahead of time (predetermined). To minimize cost, the borrower may assign the largest file or piece to the cheapest selected lender.

At step 413, the individual files and pieces of files are arranged or ranked in order, e.g., from largest sized file/piece to smallest. At step 414, the largest file or piece of a file can be assigned to the lender ranked as the cheapest at step 403, then the next largest file or piece of a file may be assigned to the next cheapest lender, and the assignments continue until each of the "m" selected lenders is assigned a file or piece of a file. The process then continues to step 410.

If time is of greater concern than cost, the borrower may prefer to minimize the time for downloading file(s). This corresponds to the user placing a high priority on I/O throughput. Ideally, the borrower would like each download to finish at the same time so no extra wait time is required. Thus, for this exemplary embodiment, it is assumed the borrower would like to download a large file or files divided into "m" individual files and/or pieces of a file and assign these files and/or pieces of a file to "m" lenders with the fastest bandwidth connection.

Figure 6:
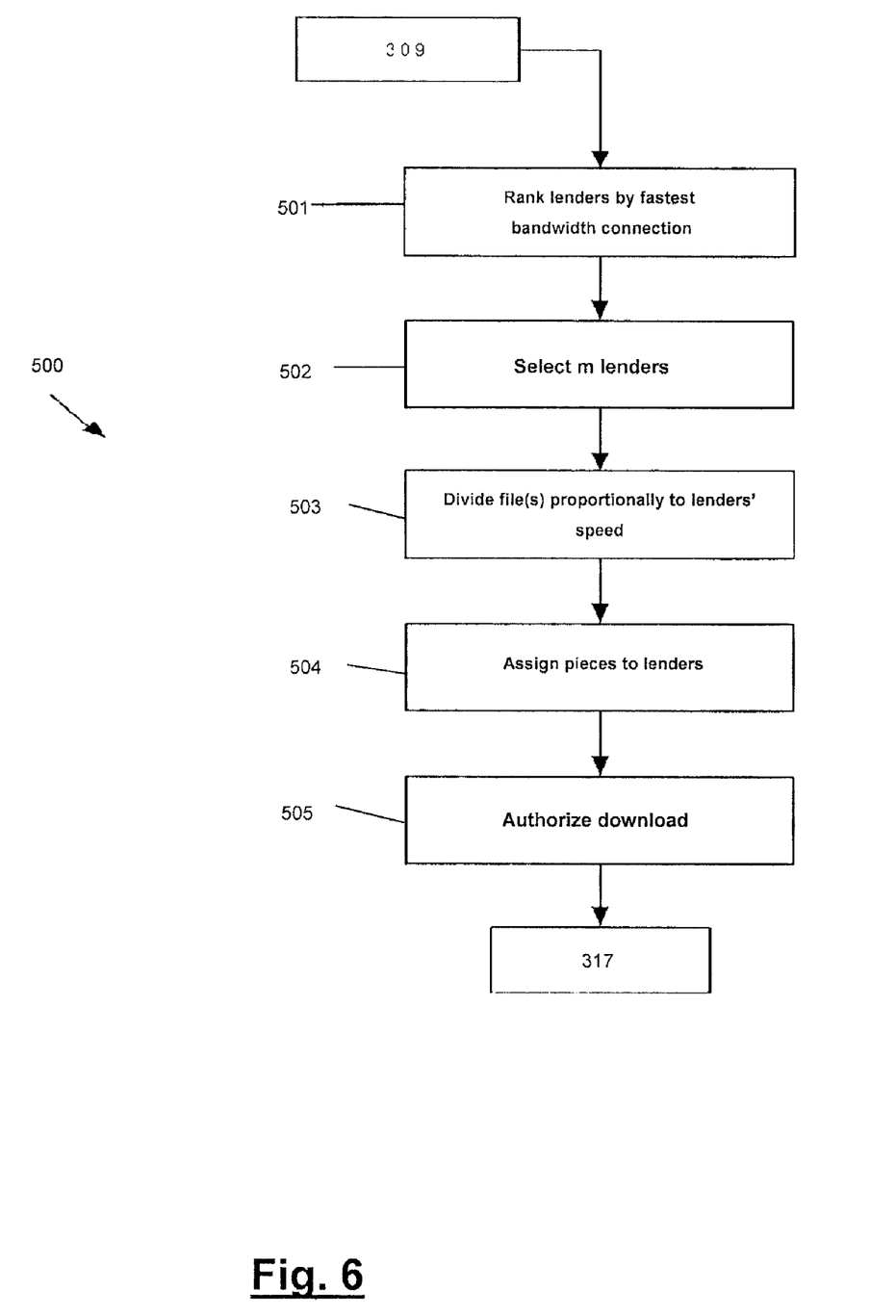
FIG. 6 is a flow diagram for generally implementing optimization for minimum time in accordance with aspects of the invention.

To achieve this result, an exemplary process 500 is illustrated in FIG. 6 for selecting lenders in order to minimize time. At step 501, the lenders with the fastest bandwidth connections can be arranged or ranked in order from fastest to slowest. The borrower can select the "m" lenders with the fastest bandwidth connections to download the file(s) at step 502. The borrower may then decides at step 503 how to divide the file(s) so that, when assigned to the selected lenders at step 504, the downloads will finish at the same time.

To assist in this regard, the portion for each lender can be determined from Equations 6 and 5:

$$T = f1/\text{bandwidth}1 = f2/\text{bandwidth}2 = \ldots fm/\text{bandwidth}m \quad \text{(Equation 6)}$$

$$F = f1 + f2 + \ldots + fm \quad \text{(Equation 5)}$$

Where: T is the time for completing the download;

fj is the size of the file or piece of large file F assigned to lender j, for j=1 ... m; and F is the size of the large file that the borrower would like to download.

After assigning the file or piece of a file to each lender at step 504, authorization to complete the task may be given at step 505, and the upload/download process for each of the files or pieces of a file through the selected lenders can begin at step 317.

From equation 6 it is apparent that, since the bandwidth of each lender is known and F, the size of the large file(s) is known, these equations are easily solved to determine the desirable file or piece of a file that each lender should have in order to minimize the total download time.

Figure 7:
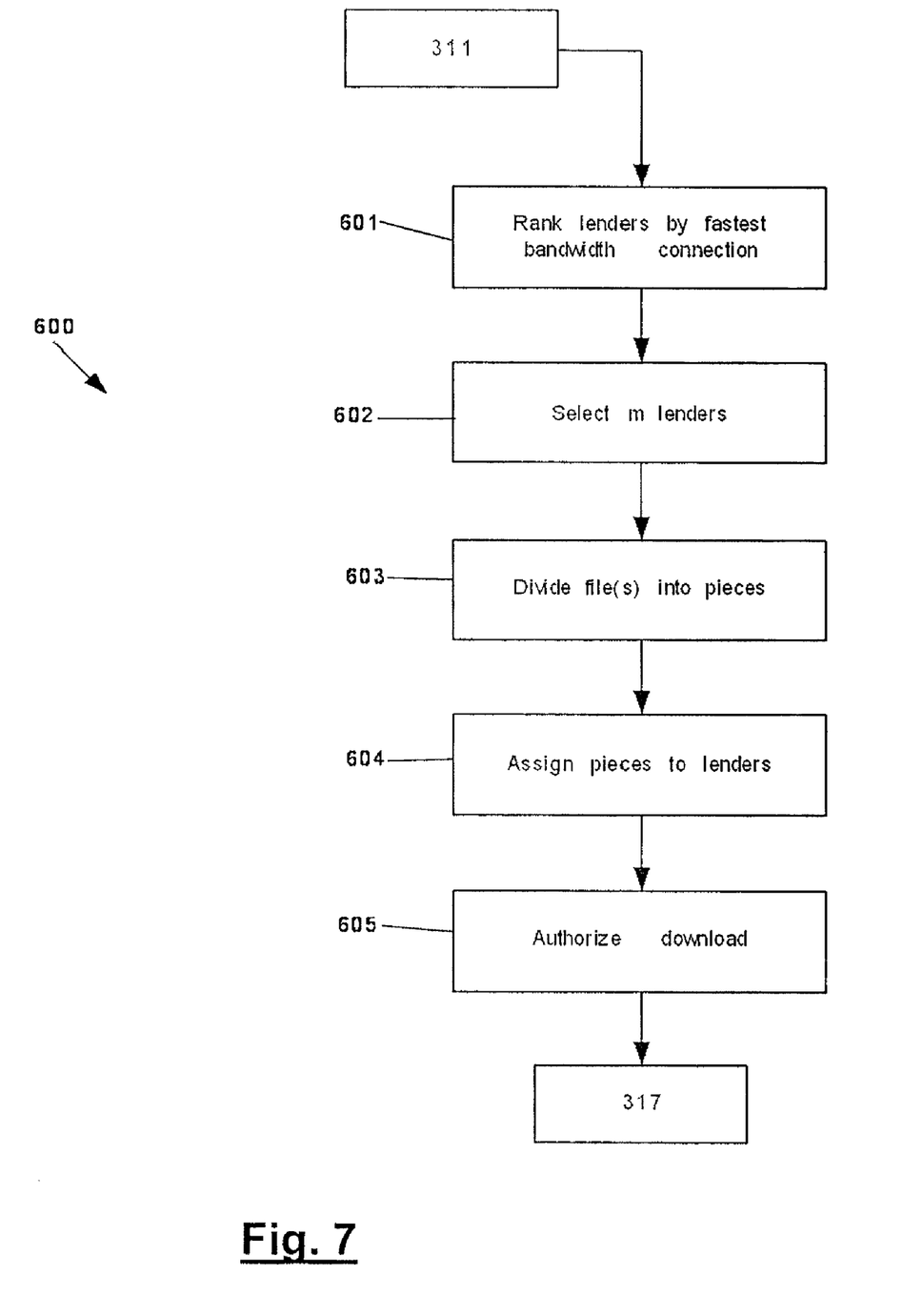
FIG. 7 is a flow diagram for generally implementing optimization for maximum throughput in accordance with aspects of the invention.

In a further optional manner for optimizing lender selection, the borrower might consider optimizing throughput. According to this exemplary embodiment, a process 600 for selecting lenders in order to maximize throughput is illustrated in FIG. 7. At step 601, the lenders with the fastest bandwidth can be arranged or ranked in order from fastest to slowest. The borrower can select the "m" lenders with the fastest bandwidth to download the file(s) at step 602. The borrower then decides at step 603 how to divide the file(s) so that, when assigned to the selected lenders at step 604, the aggregated bandwidth will be maximized.

After assigning the file or piece of a file to each lender at step 604, authorization to complete the task is given at step 605, and the process can begin downloading the file(s) through the selected lenders at step 317.

In a further option, the borrower may optimize selection of lenders based upon lender reliability, e.g., to minimize the risk of connection drop-offs. This option can be based, e.g., on an assumption that the closer the lender is to the borrower, the stronger the connection signal would be. Therefore, to minimize the risk of connection drop-offs due to weak signals, the borrower can select a set of lenders that are closer in proximity to the borrower's location. The well-known Shortest Path algorithm, or related network topology algorithms, can be used here to determine the set of "m" lenders that the borrower should use. After assigning the file or piece of a file to each lender, the process can begin downloading the file(s) through the selected lenders at step 317.

Alternatively, the borrower can select bandwidth solely from lenders who provide duration guarantees or expectations of remaining in the ad hoc network for times longer than the estimated download will take. Finally, the user can minimize the risk of connection drop-offs based upon lender "user ratings," which may illustrate the lender's past performance in such lending scenarios. Such reliability information can be stored, e.g., in the database of the service provider and sent to the borrower in the event this optimization parameter is selected. After assigning the file or piece of a file to each lender, the process can begin downloading the file(s) through the selected lenders at step 317.

In a still further optimization variation, the lenders can disclose special capabilities, e.g., video streaming, data encryption, willingness to transship a wide variety of content, etc. In this way, based on the downloading/uploading needs of the borrower, a particular file or piece of a file can be assigned to leverage the lender's capabilities first. For example, in the event the borrower intends to download movies, the borrower can seek out lenders with the bandwidth to download movies. Such capability information can be stored, e.g., in the database of the service provider and sent to the borrower in the event this optimization parameter is selected. After assigning the file or piece of a file to each lender, the process begins downloading the file(s) through the selected lenders at step 317.

In an exemplary embodiment of this option, the borrower can divide the lenders into groups according to their capabilities. In this manner, certain groups of lenders will be assigned exclusively for certain tasks. For example, the borrower can select the list of lenders who have video streaming capabilities and then assign each of them with a download task. Then, other lenders, who may not have any specialties, can be utilized for web surfing.

In an alternative exemplary embodiment of this option, the borrower can assign a percentage of tasks to a group of lenders having capabilities matching task requirements. For example, a desirable percentage (e.g., 80%) of the movie download tasks can be assigned to be handled by the lenders with video streaming capabilities, and use the rest of the 20% of their bandwidth for other tasks.

While the instant invention for optimizing the selection of lenders by a borrower, it is understood that the illustrated examples provided are for the purpose of explanation and are not to be construed as limiting. Thus, it is understood that borrowers may optimize their selection of lenders according to other criteria without departing from the scope of the invention. Further, it is understood that the process discussed with regard to the illustrated examples is likewise provided for ease of explanation, and should not be construed as limiting. Thus, it is understood borrowers may utilize different procedures in optimizing their selection of lenders according to the criteria of the invention without departing from the scope of the invention.

While the invention has been described in terms of embodiments, those skilled in the art will recognize that the invention can be practiced with modifications and in the spirit and scope of the appended claims. For example, while the embodiments have been described with reference to exemplary illustrations and processes, those skilled in the art will recognize that the invention can be practiced with any number of lenders, files, file portions, ISPs, and/or remote locations. Additionally, it should be recognized that a combination of any of the above options may be implemented, where appropriate.

What is claimed:

1. A method, comprising:
   identifying available lenders within a vicinity of a borrower;
   selecting a number of lenders based upon at least one optimization criterion;
   dividing at least one file to be one of uploaded and downloaded into parts corresponding to the number of selected lenders;
   assigning a part of the at least one file to each selected lender; and
   performing one of an upload and a download of the parts through the selected lenders,
   wherein the identifying, the selecting, the dividing, the assigning, and the performing are performed in a peer-to-peer architecture as part of an ad hoc mobile network in which the parts are communicated between the borrower and the selected lenders via local wireless communication protocol and the parts are communicated between the selected lenders and one or more remote locations via wireless telephony packet protocol.

2. The method of claim 1, wherein the available lenders have available bandwidth to lend to the borrower.

3. The method of claim 1, wherein the at least one optimization criterion comprises at least one of minimizing cost, minimizing time, maximizing throughput, minimizing risk of drop-offs, maximizing reliability, and maximizing lender capabilities.

4. The method of claim 1, further comprising calculating a cost for performing one of an upload and a download of the at least one file for each available lender of the available lenders.

5. The method of claim 4, further comprising ranking the available lenders in order based upon the calculated cost.

6. The method of claim 5, wherein the at least one file is divided into equal sized parts.

7. The method of claim 5, wherein the parts of the divided at least one file are of unequal size.

8. The method of claim 7, wherein a largest part of the unequal sized parts is assigned to a least expensive lender.

9. The method of claim 1, further comprising ranking the available lenders in order based upon bandwidth connection speed.

10. The method of claim 9, wherein the at least one file is divided into equal sized parts.

11. The method of claim 9, wherein the parts of the divided at least one file are of unequal size.

12. The method of claim 11, wherein a largest parts of the unequal sized parts is assigned to the lender with a fastest bandwidth connection speed.

13. The method of claim 9, wherein the parts of the at least one file are sized so that, when each part is assigned to a selected lender, one of an uploading and a downloading of the parts is completed at a same time.

14. The method of claim 1, further comprising ranking lenders based upon reliability.

15. The method of claim 1, further comprising ranking lenders based upon fewest occurrences of drop-offs as lender.

16. The method of claim 1, further comprising grouping lenders based upon capabilities.

17. The method of claim 1, further comprising ranking lenders based upon borrower satisfaction.

18. The method of claim 1, further comprising storing information about lenders in a centralized database.

19. The method of claim 18, wherein the stored information about lenders includes cost structure, bandwidth connection speed, lender capabilities, and reliability data.

20. The method of claim 19, wherein the cost structure comprises at least one of price per unit time and price per Mb downloaded or uploaded.

21. The method of claim 1, further comprising reassembling the parts of the at least one file after the one of an upload and a download.

22. The method of claim 1, wherein the steps of claim 1 are provided by a service provider on a fee and/or subscription basis.

23. The method of claim 1, wherein a service provider at least one of creates, deploys, maintains, supports an infrastructure that implements the steps of claim 1.

24. A system for optimizing selection of bandwidth in a peer-to-peer architecture, comprising:
   a device which identifies available bandwidth lenders within a vicinity of a requester;
   a selector unit to select a number of lenders based upon at least one requester optimization criterion;
   a divider structured and arranged to divide a task into a number of discrete pieces that correspond to the number of selected lenders; and
   an assignor unit to assign each discrete piece of the task to different selected lenders,
   wherein the identifying, the selecting, the dividing, and the assigning, are performed in the peer-to-peer architecture as part of an ad hoc mobile network in which the discrete pieces are communicated between the requester and the selected lenders via local wireless communication protocol and the discrete pieces are communicated between the selected lenders and one or more remote locations via wireless telephony packet protocol.

25. The system in accordance with claim 24, wherein the at least one requester optimization criterion comprises at least one of minimizing cost, minimizing time, maximizing throughput, minimizing risk of drop-offs, maximizing reliability, and maximizing lender capabilities.

26. The system in accordance with claim 24, further comprising a calculating unit to determine a cost for each available bandwidth lender to perform the task.

27. The system in accordance with claim 24, further comprising a listing device to rank available bandwidth lenders in order based upon at least one of a calculated cost for completing the task and bandwidth connection speed.

28. The system in accordance with claim 27, wherein the divider is structured and arranged to divide the task into equal sized pieces.

29. The system in accordance with claim 27, wherein divider is structured and arranged to divide the task into pieces not of equal size.

30. The system in accordance with claim 29, wherein the assignor unit assigns a largest piece of the pieces of not equal size to a lowest cost lender.

31. The system in accordance with claim 29, wherein the assignor unit assigns a largest piece of the pieces of not equal size to a fastest connection speed lender.

32. The system in accordance with claim 24, wherein the divider unit divides the task so that each piece of the task is completed at a same time.

33. The system in accordance with claim 24, further comprising a centralized database to store lender information composed of at least one of cost structure, bandwidth connection speed, lender capabilities, and reliability data.

34. The system in accordance with claim 33, wherein the cost structure comprises at least one of price per unit time and price per Mb downloaded or uploaded.

35. The system in accordance with claim 24, further comprising a reassembling unit structured and arranged to reassemble each discrete piece of the task.

36. A system comprising:
a server having a database containing data associated with one or more instructions for implementing a peer-to-peer ad-hoc network; and
at least one of a hardware and software component for optimizing selection of lenders of bandwidth and allocation of one of files and pieces of files to the selected lenders of bandwidth and for establishing the peer-to-peer ad-hoc network between a borrower and the selected lenders of bandwidth,
wherein the selection and the allocation are performed in a peer-to-peer architecture as part of the peer-to-peer ad hoc network in which the one of files and pieces of files are communicated between the borrower and the selected lenders via local wireless communication protocol and the one of files and pieces of files are communicated between the selected lenders and one or more remote locations via wireless telephony packet protocol.

37. The system in accordance with claim 36, wherein borrower preferences for optimizing the selection of lender of bandwidth and allocating the files and pieces of files are predefined and input to the at least one of hardware and software component for optimizing.

38. The system in accordance with claim 36, wherein the borrower is prompted to input data for optimizing the selection of lender of bandwidth and allocating the files and pieces of files to the at least one of hardware and software component for optimizing.

39. A method for optimizing selection of bandwidth in a peer-to-peer architecture, comprising:
a computer infrastructure operable to:
select a number that corresponds to a number of lenders of bandwidth from which to borrow bandwidth and to a number of discrete pieces to divide a task;
select a number of lenders of bandwidth from a listing of available lenders; and
assign each piece of the divided task to a different selected lender of bandwidth,
wherein the selecting the number of lenders and the assigning are performed in the peer-to-peer architecture as part of a peer-to-peer ad hoc mobile network in which the pieces of the divided task are communicated between a borrower and the selected lenders via local wireless communication protocol and the pieces of the divided task are communicated between the selected lenders and one or more remote locations via wireless telephony packet protocol.

40. A computer program product comprising a non-transitory computer usable storage medium having readable program code embodied in the non-transitory medium and including at least one component to:
identify available bandwidth lenders within a vicinity of a requester;
select a number of lenders based upon at least one optimization criterion;
divide a task into discrete pieces that correspond in number to the selected lenders; and
assign each discrete piece to a different selected lender,
wherein the identifying, the selecting, the dividing, and the assigning are performed in a peer-to-peer architecture as part of a peer-to-peer ad hoc mobile network in which the pieces of the divided task are communicated between the requester and the selected lenders via local wireless communication protocol and the pieces of the divided task are communicated between the selected lenders and one or more remote locations via wireless telephony packet protocol.

41. The computer program product in accordance with claim 40, wherein the at least one requester optimization criterion comprises minimizing cost, minimizing time, maximizing throughput, minimizing risk of drop-offs, maximizing reliability, maximizing lender capabilities.

42. The computer program product in accordance with claim 40, further including at least one component to rank the available bandwidth lenders by at least one of a calculated cost for completing the task and bandwidth connection speed.

43. The method of claim 1, wherein the borrower utilizes bandwidth of the selected lenders in parallel to create a virtual fat pipe for transmission of data over a cellular network.

44. The method of claim 43, further comprising:
the borrower performing one of: (i) splitting the at least one file into the parts and transmitting the parts in parallel to the selected lenders, and (ii) receiving the file parts in parallel from the selected lenders and joining the file parts to re-create the file;
calculating a cost for performing one of an upload and a download of the at least one file for each available lender of the available lenders; and
storing information about lenders in a centralized database,
wherein the at least one optimization criterion comprises at least one of minimizing cost, minimizing time, maximizing throughput, minimizing risk of drop-offs, maximizing reliability, and maximizing lender capabilities.

* * * * *